United States Patent [19]
McCloskey

[11] 3,832,020
[45] Aug. 27, 1974

[54] ANTI-FRICTION BALL BEARING ASSEMBLY

[75] Inventor: Albert R. McCloskey, Fairfield, Conn.

[73] Assignee: Heim Universal Corporation, Fairfield, Conn.

[22] Filed: Aug. 31, 1972

[21] Appl. No.: 285,201

[52] U.S. Cl. .............................. 308/6 C, 308/188
[51] Int. Cl. .......................................... F16c 29/06
[58] Field of Search............ 308/6 C, 188; 29/148.4

[56] References Cited
UNITED STATES PATENTS
2,534,929 12/1950 Schultz et al. ..................... 308/188
3,001,838 9/1961 Lamson et al. .................... 308/188
3,089,221 5/1963 Barr ............................. 308/DIG. 7
3,330,606 7/1967 Suda .................................. 308/6 C OTHER PUBLICATIONS
Machine Design, June 22, 1972, pp. 116, 118.

*Primary Examiner*—Manuel A. Antonakas
*Assistant Examiner*—Barry Grossman

[57] ABSTRACT

An anti-friction ball bearing assembly adapted for mounting on a shaft comprising an outer sleeve and an inner sleeve concentrically fitting within the outer sleeve, the inner sleeve having a number of tracks defining paths for the circulation of a number of plastic load carrying balls between the shaft and the bearing assembly. The plastic load carrying balls may be provided with a metallic or hardened plastic core.

2 Claims, 3 Drawing Figures

PATENTED AUG 27 1974 3,832,020

ANTI-FRICTION BALL BEARING ASSEMBLY

BACKGROUND OF THE INVENTION

This invention relates to a ball bearing assembly adapted to move longitudinally along the shaft.

This invention represents an improvement in the ball bearing assembly disclosed in patent application Ser. No. 189,898 filed in the U.S. Patent Office on Oct. 18, 1971 by Andrew Henn.

In particular the invention relates to an anti-friction ball bearing assembly adapted for mounting on a shaft comprising an outer sleeve and an inner sleeve concentrically fitting within the outer sleeve, the inner sleeve having a number of tracks defining paths for the circulation of a number of plastic load carrying balls between the shaft and the bearing assembly. The plastic load carrying balls may be provided with a metallic or hardened plastic core.

The prior art is replete with different types of anti-friction recirculating ball bearing assemblies. Generally, the prior art recirculating ball bearing systems are basically inefficient mechanisms. This inefficiency is typically caused by the friction encountered between the various moving parts of the recirculating ball bearing assembly. A source of such friction is the rolling friction of the load carrying balls on the raceways of the outer sleeve.

Another deficiency of the prior art anti-friction recirculating ball bearing assemblies is that they can be relatively noisy in operation. This problem is of course compounded as the various bearing components wear.

SUMMARY OF THE INVENTION

Accordingly, it is an object of the present invention to provide an anti-friction ball bearing assembly adapted for mounting on a shaft comprising an outer sleeve and an inner sleeve concentrically fitting within the outer sleeve, the inner sleeve having a number of tracks defining paths for the circulation of a number of plastic load carrying balls. The plastic load carrying balls may be provided with metallic or hardened plastic cores for strengthening purposes.

It is another object of the present invention to provide a highly efficient ball bearing assembly capable of being inexpensively manufactured and being simplistic in design.

Another object of the present invention is to provide an improved anti-friction ball bearing assembly being highly adaptable to relating low load precision applications.

It is still another object of the present invention to provide an improved anti-friction ball bearing assembly which can be manufactured using automated high volume techniques.

It is yet another object of the present invention to provide a superior low noise anti-friction ball bearing assembly.

Another important object of the present invention is to provide an improved ball bearing assembly in which the plastic load carrying balls may electrically isolate the shaft from the ball bearing assembly as well as any element or member connected to the bearing assembly.

Other objects and advantages of the invention will become apparent as the present invention is better understood from the following disclosure and as shown in the accompanying drawings.

DESCRIPTION OF THE INVENTION

Figure 1:
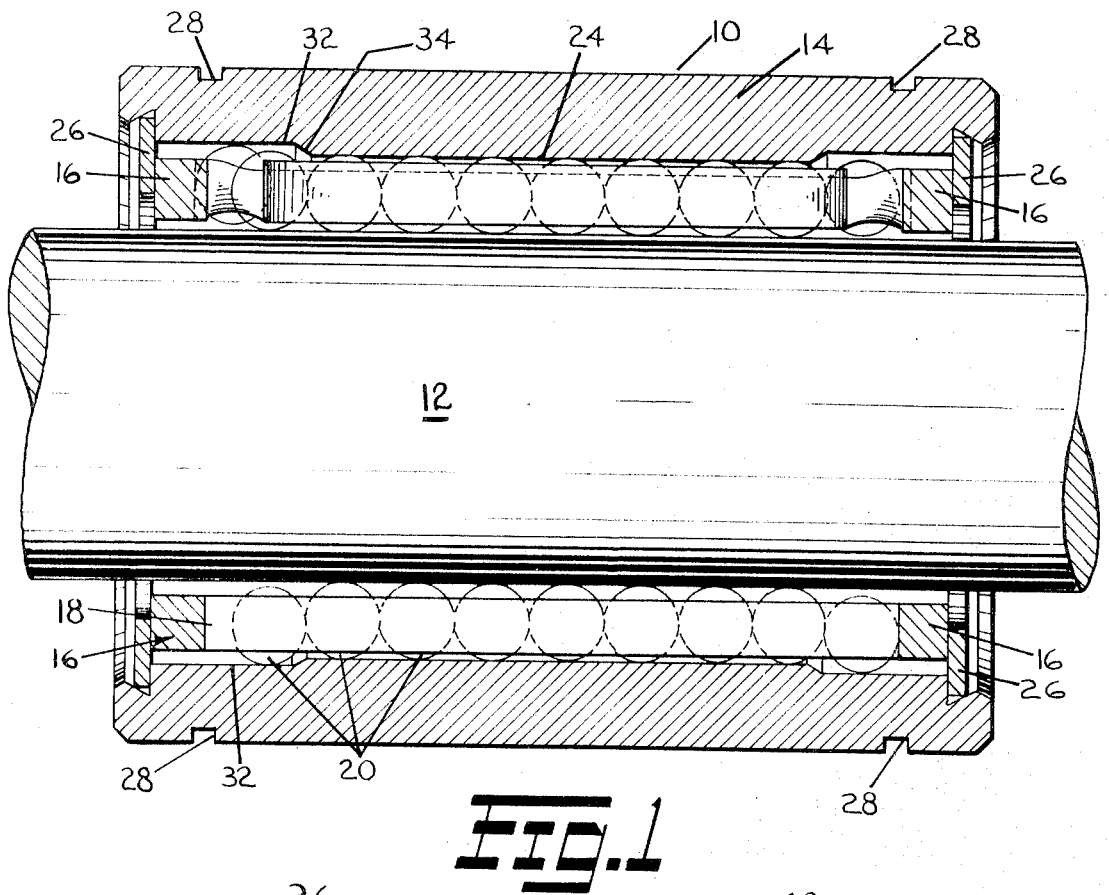
FIG. 1 is a side elevational view, partially cut away, of an anti-friction ball bearing assembly mounted on a shaft embodying the concept of the present invention.

Referring now to the drawings and in particular to FIG. 1 there is shown an improved anti-friction ball bearing assembly embodying the concept of the present invention wherein the anti-friction ball bearing assembly is generally designated by the numeral 10.

The anti-friction ball bearing assembly is particularly adapted for being mounted, for linear translation, on a shaft 12. The anti-friction ball bearing assembly 10 is provided with an outer sleeve 14 and an inner sleeve 16. The inner sleeve 16 is concentrically interfitted within the outer sleeve 14. The outer surface of the inner sleeve 16 may be polyhedronal in shape and may have a number of axially extending planar surfaces (not shown). The inner sleeve 16 is further provided with a number of closed loop tracks 18 which define paths for the circulation of plastic load carrying balls 20. The inner surface of the outer sleeve 14 may also be substantially polyhedronal in shape. The inner surface of the outer sleeve 14 has a number of axially extending planar surfaces. The shape of the inner surface of the outer sleeve 14 generally conforms to the shape of the outer surface 18 of the inner sleeve 16. The outer surface of the inner sleeve 16 therefore may be placed in registration with the inner surface of the outer sleeve 14 at their respective axial extending planar surfaces.

Each of the axially extending planar surfaces of the outer sleeve 14 are provided with axially extending bearing raceways 24.

The load carrying balls 20 may be manufactured entirely of plastic such as Nylons, Acetals (including Acetal, TFE — fiber filled), Polycarbonates and fabric-filled Phenolics. These materials would afford the plastic load carrying balls 20 both high-tensile strength and high-impact strength. Additionally, such load carrying balls 20 made of such plastics would have relatively high fatigue resistance and stability at higher operating temperatures.

The plastic load carrying balls 20 could be machinable or moldable to the necessary tolerances using high volume automated techniques.

Retaining means such as snap rings 26 are provided at each end of the anti-friction ball bearing assembly 10 to positionally anchor the inner sleeve 16 into outer sleeve 14 to thereby maintain the operational integrity of the anti-friction ball bearing assembly 10. The snap rings 26 therefore maintain the axial position of the inner sleeve 16 with respect to the outer sleeve 14 while the aforementioned registration of the axial extending planar surfaces of the inner sleeve 16 and the outer sleeve 14 maintain the radial position of the inner sleeve 16 with respect to the outer sleeve 14.

The outer surface of the outer sleeve 14 may be substantially cylindrical in shape and may be provided with annular grooves 28. The grooves 28 may be adapted to receive retaining means such as snap rings (not shown), to positionally anchor or attach the anti-friction ball bearing assembly 10 within or to a bushing or housing member (also not shown).

The planar surfaces of the outer sleeve 14 may terminate at each end in a concave end surface 32. These concave end surfaces 32 are recessed with respect to the axially extending planar surfaces of the outer sleeve 14 and axially extending raceways 24. A smooth transition is provided between the raceways 24 and concave end surfaces 32 by means such as tapered surface 34.

As can be seen from the above, the anti-friction ball bearing assembly 10 can be generally described as a linear (circulating) ball bearing. In particular, the anti-friction ball bearing assembly 10 essentially provides linearly moving bearing support between some member such as the above noted bushing (not shown) and shaft 12. As the anti-friction bearing assembly 10 moves along the shaft 12, the load carrying balls 20 will tend to roll and circulate in and through the tracks 18 in the inner sleeve 16. The plastic load carrying balls 20 therefore assume two basic positions, an active or loaded position or an inactive or unloaded postion. In the active position, the plastic balls 20 will provide rolling support between the outer sleeve 14 (and in turn the bushing or other member to which it is attached) and the shaft 12, as the shaft 12 and the anti-friction ball bearing assembly 10 (and bushing) move with respect to each other. In the inactive position, the plastic load carrying balls 20 are in effect doing no useful work but are being recirculated to their active position. The load carrying balls 20 when in their inactive position, are not therefore in contact with the shaft 12. The load carrying balls 20 will circulate in a direction depending upon the relative motion of the anti-friction ball bearing assembly 10 with respect to the shaft 12. The plastic load carrying balls 20 track from their active to inactive position and will be disengaged from the shaft at the time they encounter the tapered portion 34. This occurs before the load carrying balls 20 reach the curved portion of the tracks. The inner sleeve 16 also has no load imparted to it by the action of either the load carrying balls 20 and it serves simply as a cage for the plastic load carrying balls 20. The longitudinal axis of the straight portion of the closed loop tracks 18 in which the plastic load carrying balls 20 ride during their unloaded state is generally parallel to the lines described by the intersection of the planar surfaces of the outer sleeve 14. The load carrying balls 20 could be carried in the tracks 18 in a controlled position made by caging means (not shown) such as a wire or plastic retaining means.

Figure 2:
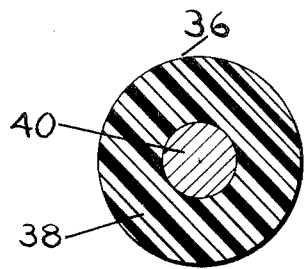
FIG. 2 is an enlarged sectional view of a form of a load carrying ball which can be used in the anti-friction ball bearing assembly of FIG. 1.

Referring now to FIG. 2, there is shown a sectional view of a form of a load carrying ball 36 which can be used in the anti-friction ball bearing assembly 10 of FIG. 1. The difference between the load carrying balls 20 and 36 is that the latter has a metallic core while the former is entirely of plastic. The load carrying ball 36 has an outer layer of plastic 38 which could be selected from the aforementioned group of plastics from which the plastic load carrying ball 20 could be manufactured.

The load carrying ball 36 is also provided with a metallic core 40 which would of course improve the strength properties of the ball 36. The core could be manufactured from various types of metals such as aluminum, steel and the like. The surface of the core 40 could be suitably roughened to improve the bond between the plastic layer 38 and core 40.

Figure 3:
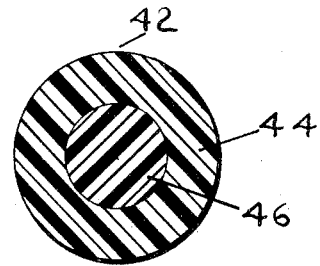
FIG. 3 is an enlarged sectional view of another form of a load carrying ball which can be used in the anti-friction ball bearing assembly of FIG. 1.

Referring now to FIG. 3, there is shown a sectional view of another form of a load carrying ball 42 which can be used in the anti-friction ball bearing assembly 10 of FIG. 1. The difference between the load carrying balls 36 and 42 is that the latter has a hardened plastic core while the former has, as above stated, a metallic core 40. The load carrying ball 42 has an outer layer of plastic 44 which could be selected from the aforementioned group of plastics from which the completely plastic load carrying ball 20 could be manufactured.

The load carrying ball 42 is also provided with a hardened metallic core 46 which will improve the strength properties of the ball 42. The core could be manufactured from various plastics such as densified Nylon, Acetals or Phenolics. The core 46 could also be provided with suitable materials such as metallic chips to increase the overall impact strength of the ball 42.

It should be noted that the load carrying balls 20, 36 and 42 could all be suitably arranged in a pre-loaded fashion within the anti-friction ball bearing assembly.

The various components of the anti-friction ball bearing assembly 10 could be manufactured from a wide range of materials utilizing a number of fully automated techniques. For example, the outer sleeve 14 could be manufactured from steel such as SAE 5200 steel. Additionally, the sleeve could be suitably coated and/or treated depending upon application and environment.

As mentioned before, the inner sleeve 16 is effectively isolated from loads. Accordingly, the inner sleeve 16 could be manufactured from an even wider range of materials such as zinc alloys, plastics as well as other moldable materials. Obviously, the various bearing surfaces of the bearing 10 could be coated with a suitable self-lubricating plastic such as polytetrafluoroethylene.

Both the inner sleeve 16 and the outer sleeve 14 could be manufactured using high volume manufacturing techniques. In particular, the design of the outer sleeve 14 renders it particularly adaptable to broaching. The inner surface of the outer sleeve 14 comprising both the axially extending planar surfaces and the raceways 24 could be broached by utilizing a pull or push broach. Preferably, a pull broach would be utilized for such a broach and would be less apt to bind during the cutting operation of the inner surface. Other suitable machining and/or molding operations could likewise be utilized to manufacture and fabricate the inner sleeve.

Assembly of the overall anti-friction ball bearing assembly in a like manner could be accomplished by using advance automated techniques.

As mentioned before, another important aspect of the present invention is that the plastic load carrying balls 20 or 36 may be used to electrically isolate the shaft 12 from the anti-friction ball bearing assembly. This of course is due to the fact that the plastic load carrying balls are essentially of a non-conductive material. Of course, it is to be noted that the balls could probably be made to conduct electricity by the use of appropriate fillers or other like conducting elements.

Obviously, the present invention is not limited to the specific details as herein described, but is capable of other modifications and changes without departing from the spirit and scope of the appended claims.

I claim:

1. An anti-friction ball bearing assembly adapted for mounting on a shaft comprising an outer sleeve and an inner sleeve concentrically fitting within the outer sleeve, the inner sleeve having a number of tracks defining paths for the circulation of a number of plastic load carrying balls, each of said plastic load carrying balls have a hardened plastic core surrounded by a plastic layer, said plastic layer being bonded to said hardened plastic core.

2. An anti-friction ball bearing assembly adapted for mounting on a shaft comprising an outer sleeve and an inner sleeve concentrically fitting within the outer sleeve, the inner sleeve having a number of tracks defining paths for the circulation of a number of plastic load carrying balls, said plastic load carrying balls are manufactured from a fabric filled plastic.

* * * * *